3,260,772
FLAME-RESISTANT RUBBER-RESIN COMPOSITION
William Cummings, Woodbury, Conn., assignor to United States Rubber Company, New York, N.Y., a corporation of New Jersey
Filed Aug. 1, 1963, Ser. No. 299,355
11 Claims. (Cl. 260—876)

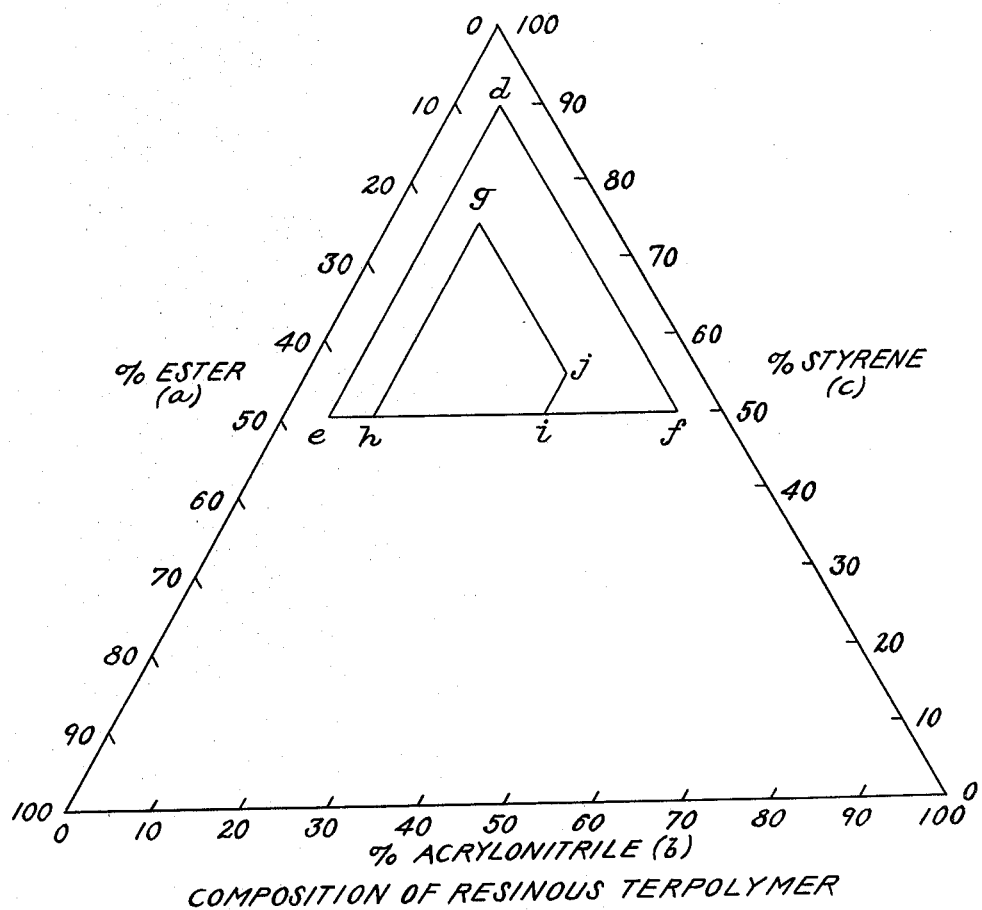

This invention relates to a high impact, flame-resistant thermoplastic "gum plastic" composition, that is, a rubber-resin composition. The invention is based on the unexpected discovery that gum plastic compositions that are at once flame-resistant and impact resistant are obtained by blending (A) a resinous terpolymer of (a) a polymerizable ester of a halogen-containing alcohol with a monoethylenically unsaturated carboxylic acid, (b) acrylonitrile and (c) styrene, in admixture with (B) a rubbery polymer based on butadiene.

This application is a continuation-in-part of my copending application Serial No. 211,096, filed July 19, 1962, and now abandoned.

The invention will be described with reference to the accompanying drawing, the single figure of which is a graph, on triangular coordinates, representing the composition of the terpolymer resin.

Certain thermoplastic gum plastic compositions based on mixtures of rubber and resin are known to have high impact strength and are extremely useful for making tough, shaped objects of various sorts by such methods as molding, extrusion and calendering. Sheets of such high-impact resin-rubber blends are especially useful for making articles by vacuum drawing processes. In these compositions the resin and rubber may be separately prepared and then physically admixed (either in latex form or in dry form) as in U.S. Patents 2,439,024, Daly, April 6, 1948, or 2,600,024, Romeyn and Petras, June 10, 1952. Alternatively the rubber-resin material may be provided at least in part in the form of a "graft copolymer" made by copolymerizing resin-forming monomers onto a latex of a previously prepared rubbery polymer spine, as in U.S. Patent 2,820,733, Childers and Fisk, January 21, 1958. Unfortunately, such compositions, for all their desirable properties, are not flame-resistant. It would be highly desirable to have a high impact strength rubber-resin material which is flame-resistant.

Accordingly, the principal object of the present invention is to provide a new rubber-resin blend which not only has good impact strength but is flame-resistant.

A further object is to provide a tough, high-impact strength rigid thermoplastic composition suitable for such applications as making machine housings (e.g. for air conditioners and the like) where flame-resistance is desirable.

Previous attempts to make high impact resin-rubber blends, for example by adding plasticizers of high chlorine content to the gum plastic, have not been satisfactory because the resulting mixtures had poor physical properties and suffered from poor light stability.

The invention provides an improved composition, in which the resinous portion is a terpolymer of (a) a polymerizable ester of a halogen-containing alcohol with a monoethylenically unsaturated carboxylic acid, (b) acrylonitrile and (c) styrene. Although the monomers may be combined in any suitable desired proportions, the terpolymer will supply contain at least 5% (all quantities are expressed herein by weight) of the described ester (a), at least 5% of acrylonitrile (b), and at least 10% of styrene (c), (the percentage of each of the three ingredients of course adding to 100%). Preferred terpolymers contain at least 5% of the halogen-containing ester (a), at least 5% of acrylonitrile, and at least 50% of styrene. In the typical terpolymer, the relative proportions of the described ester (a), the acrylonitrile (b), and the styrene (c), fall within the triangle *def* shown in the graph in the accompanying drawing. The coordinates of this triangle are as follows:

| Component | Coordinates (percent by weight) | | |
|---|---|---|---|
| | d | e | f |
| (a) Ester | 5 | 45 | 5 |
| (b) Acrylonitrile | 5 | 5 | 45 |
| (c) Styrene | 90 | 50 | 50 |

More preferred halogen-containing resins are those having a composition falling within the polygon *ghij* shown in the drawing, which has the following coordinates:

| Component | Coordinates (percent by weight) | | | |
|---|---|---|---|---|
| | g | h | i | j |
| (a) Ester | 15 | 40 | 20 | 15 |
| (b) Acrylonitrile | 10 | 10 | 30 | 30 |
| (c) Styrene | 75 | 50 | 50 | 55 |

In the mixture of such halogen-containing terpolymer resin (A) with the rubber portion (B), the halogen-containing terpolymer resin (A) may amount to from 50% to 95%, while the rubbery portion (B) may range, correspondingly, from 50% to 5%. Preferred mixtures contain from 70% to 95% of the halogen-containing terpolymer resin (A) and correspondingly from 30% to 5% of the rubbery ingredient (B). The mixtures may be made by latex blending, or by dry mixing, or by a combination of these procedures.

The rubbery ingredient (B) employed in the invention may be described as a butadiene polymer, and is frequently a butadiene-acrylonitrile rubbery copolymer. Frequently it takes the form of a rubbery copolymer of from about 14% to about 40% of acrylonitrile with correspondingly from about 86% to about 60% of butadiene, and it may be prepared by the usual well-known emulsion polymerization processes. A small amount of a cross-linking monomer, e.g. divinylbenzene, may be included. In preparing the rubbery copolymer (B) there may also be included, as a comonomer, the previously described ester (a) of a halogen-containing alcohol with a monoethylenically unsaturated acid, in amount up to 15%, based on the total weight of acrylonitrile, butadiene, and such ester (e.g., terpolymer of at least 60% butadiene, up to 15% ester (a), the remainder being acrylonitrile in amount of at least 14%).

The rubbery ingredient (B) need not necessarily be prepared entirely separately from the resinous ingredient (A), but instead these two ingredients may be prepared at least in part in the form of a graft copolymer of resin-forming monomers on previously prepared rubber latex. For this purpose the previously prepared rubber latex may take the form either of polybutadiene or a rubbery copolymer of butadiene with a minor amount (e.g. up to 25% on the weight of the copolymer) of one or more suitable copolymerizable monomer such as styrene or acrylonitrile and/or the previously described halogen-containing ester (a). Onto this base or spine rubber there are "grafted" resin-forming monomers including styrene and acrylonitrile, with or without the halogen-containing unsaturated ester (a) previously described. It will be understood, that if the graft copolymer contains none of the halogen-bearing ester, then the required quantity of that ingredient must be supplied by separately prepared resinous terpolymer containing such halogen-bearing ester.

Such a graft copolymer composition may contain relative proportions of rubber (meaning the polybutadiene or butadiene copolymer rubber base) and resin (meaning the grafted styrene and acrylonitrile, with or without the halogen-containing unsaturated ester) in the ranges of proportions previously stated (i.e., 50–95% resin and 50–5% rubber). Similarly, the proportions of the resin-forming monomers grafted onto the rubber may be as stated previously for the proportions of monomers in the separately prepared resin or they may vary, for example, within the ranges of 0–50% halogenated unsaturated ester (a), 5–50% acrylonitrile and 10–90% styrene; preferably 10–35% ester (a), 10–30% acrylonitrile, and the balance styrene.

Separately prepared resin, or separately prepared resin plus rubber, may be blended (by latex blending or dry blending) with the graft polymer preparation, in such proportions as to give the desired over-all ratio of rubber to resin in the final mix. In this respect a preferred practice involves preparing a graft copolymer of about 40–60 parts (preferably about 50 parts) of resin-forming monomers (i.e., acrylonitrile, styrene, with or without the described halogenated unsaturated ester) on correspondingly about 60–40 parts (preferably about 50 parts) of the rubber spine (polybutadiene or copolymer including butadiene and halogen-containing ester), and thereafter mixing such graft copolymer with sufficient separately prepared resin (i.e. resinous terpolymer of the described halogenated unsaturated ester, acrylonitrile and styrene) to provide a desired overall ratio of rubber to resin, and a desired halogen content.

In place of using acrylonitrile itself for the preparation of the resinous terpolymer or the rubber or the graft copolymer used in the invention, I may substitute, for some or all of the acrylonitrile, equivalent similar monomers such as homologs or substitution products of acrylonitrile, e.g., methacrylonitrile, ethacrylonitrile, and the like. In a preferred practice of the invention the acrylic nitrile employed is methacrylonitrile; such compositions based on methacrylonitrile are remarkable for their heat stability.

Similarly, in place of using styrene itself in the preparation of the polymers used in the invention, I may substitute, for some or all of the styrene, equivalent monomers including substitution products of styrene, such as alkyl-substituted styrenes, including alpha-alkyl styrenes and nuclear alkyl-substituted styrenes such as alpha-methylstyrene, other nuclear methyl-substituted styrenes, nuclear monoethyl-substituted styrenes, the mono- and dichloro styrenes, etc.

The expression "high impact strength" as applied to the compositions of the present invention is associated with impact strengths of at least 1 foot-pound per inch of notch, as measured at room temperature by the Izod method on a ¼″ test piece. Preferred compositions have impact strengths of 2–3 foot-pounds, and even higher, for example up to 9 foot-pounds.

Considering now in more detail the unsaturated halogen-containing ester employed in the invention, this is, as indicated, a polymerizable ester of a halogen-containing alcohol with a monoethylenically unsaturated carboxylic acid. The alcohol of such ester is a monoalcohol substituted with a halogen (e.g., bromine or chlorine) on one or more carbon atoms that are spaced from the hydroxy groups by at least one carbon atom, that is, the carbinol group

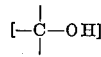

of such alcohol is halogen free. The alcohol contains at least two halogen atoms, which may be the same or different. The alcohol itself is devoid of ethylenic and acetylenic unsaturation, and may be aliphatic, cycloaliphatic, or aromatic. The alcohol contains at least two carbon atoms, preferably at least three carbon atoms, say from three to twelve or more carbon atoms.

Examples of typical operative alcohols are the following bromine-containing alcohols and their chlorine and fluorine containing counterparts:

2,3-dibromobutanol-1
3,4-dibromobutanol-1
2,3-dibromo-3-methyl-butanol-1
1,2-dibromopentanol-3
1,3-dibromopropanol-2
5,6-dibromohexanol-1
1,2-dibromoheptanol-3
1,7-dibromoheptanol-4
2,3-dibromooctanol-8
3-ethyl-5,6-dibromohexanol-3
3-methyl-2,3-dibromoheptanol-7
3-methyl-6,7-dibromooctanol-1
2,3,7-trimethyl-6,7-dibromooctanol-1
10,11-dibromoundecanol-1
1,2-dibromodecanol-3
9,10-dibromooctadecanol-1
9,10,12,13,15,16-hexabromooctadecanol-1
3-phenyl-2,3-dibromopropanol
2,4,6-tribromophenoxyethanol
2,4-dibromophenoxyisopropanol
Pentabromophenoxyethanol
2,4-dibromophenoxyethanol The acid of the ester employed in the invention is, as indicated, a monoethylenically unsaturated carboxylic acid, whether monocarboxylic or polycarboxylic. The acid is alpha ethylenically unsaturated. Thus, such acids include acrylic acid and its homologs such as methacrylic and ethacrylic acids, fumaric acid, citraconic acid, itaconic acid, aconitic acid, crotonic acid, and the like. (It will be understood that the anhydride of the acid, when available, may be substituted for the acid itself.)

The polymerizable unsaturated halogen-containing ester may be prepared in various ways. For example, the halogen containing alcohol may be reacted with an appropriate acid or its anhydride, or an ester of such acid. Thus, the reactions of dihalopropanol may be represented by the following equations:

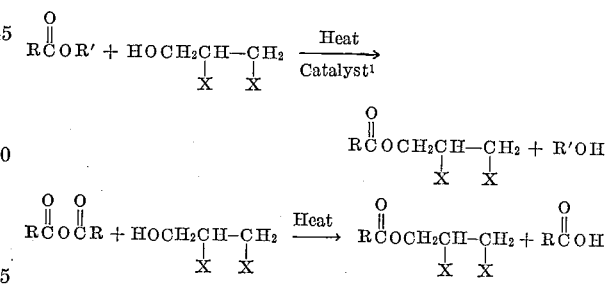

R=unsaturated group; R′=hydrogen or alkyl; and X= halogen atom (chlorine and/or bromine).

¹ R′=alkyl use acid or base; R′=H use acid only.

The syntheses of these esters may also be accomplished by the addition of halogens to the corresponding type allyl ester:

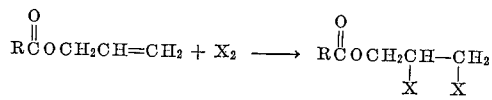

Although the polymerizable unsaturated halogen-containing esters are for convenience and clarity described as esters of halogenated alcohols, it will be apparent that in actual practice the halogen may attach to the alcohol after the reaction with the acid.

Certain of the polymerizable unsaturated halogen-containing esters employed herein are described in more detail in copending application Serial No. 2,849, filed January 18, 1960, now U.S. Patent 3,151,183.

differences do appear can readily be compensated for by (1) changes in the resin/rubber ratio (by rubber is meant the butadiene copolymer or alternatively the spine of the graft copolymer); (2) use of plasticizer or lubricant; and (3) variations in the composition and method of preparing the graft copolymer. However, given a desired level of impact strength and flame resistance, the invention teaches that one translates flame-resistance into percent halogen in the mix. From this one calculates the amount of halogen-containing monomer to be incorporated in the resin corrected for any that may be present in the rubber or graft phase. The impact property is determined primarily by the resin/rubber ratio and to a lesser extent by the amount of acrylonitrile in the separate phases. Note should be taken, however, that those rubbers containing the halogen-containing unsaturated ester give better impact values than the same blends in which the rubber does not contain unsaturated halogen-containing ester.

It is interesting to consider certain of the compositional relationships that may exist in the present invention. For the homologous series of bis(dibromoalkyl) fumarates

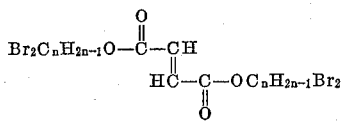

the relation between percent bromine and $n$ is

Percent $Br = 16,000/(14n+216)$

Assuming no bromine in the rubber phase, 15% bromine in the blend, and 50% resin in the blend, it would be required that the resin contain 30% bromine. Assuming that an alcohol of high bromine content is used, such as pentabromophenoxyethanol (70% bromine in its fumarate ester), it would require a terpolymer containing 43% of this ester to give a resin having a 30% bromine content. The same result could be achieved by using more of an ester containing less bromine, e.g. by using a resin containing 48.3% of bis(2,3-dibromopropyl) fumarate. In practice, it would be more appropriate to use a resin containing not more than 35% ester [using bis(pentabromophenoxyethyl) fumarate this would give a resin with 24.5% bromine] and make up the difference in required bromine content by admixing a rubber containing bromine. Thus, in practice the blends with the highest amounts of bromine will contain bromine not only in the resin, but also in the rubber. In fact, in such blends the rubber will typically contain the maximum amount of halogenated ester, since, for example, 50 parts of rubber containing 15% bis(2,3-dibromopropyl) fumarate for example will contribute 4.65 parts of bromine; a remaining 10.35 parts of bromine can be supplied by 50 parts of resin containing 33.4% bis(2,3-dibromopropyl) fumarate or 29.6% bis(pentabromophenoxyethyl) fumarate, to provide the assumed total of 15% bromine in the blend.

As an example of considerations involved in deciding on appropriate compositions containing chlorine, it may be pointed out that bis(2,3-dichloropropyl) fumarate contains 42% chlorine. A resin containing 35% of this monomer would contribute 7.35 parts of chlorine when used as one-half the blend. A rubber containing 15% of this monomer would contribute 31.5 parts of chlorine when used as one-half of the blend. The blend would contain 10.5% chlorine, which is adequate to provide ASTM flame-resistance. The bis(dichloroalkyl) fumarates would have chlorine contents given by the expression Percent $Cl = \dfrac{7100}{14n+127}$ where $n$ is the number of carbon atoms in the chain. Those blends with relatively high resin/rubber ratios will be appropriate for maximum flame-resistance. If for example, a minimum of 10% chlorine is desired in such a blend, it can be calculated that such chlorine content can be supplied by an ester of the kind indicated having up to eight carbon atoms, in a blend containing 95% resin. Numerous other suitable combinations may be calculated in a similar manner.

The following examples will serve to illustrate the practice of the invention in more detail:

EXAMPLE I

Resinous terpolymers of styrene, acrylonitrile, and bis(2,3-dibromopropyl) fumarate are prepared by emulsion polymerization from the following recipe:

| Material: | Amount (parts) |
|---|---|
| Monomers | 100 |
| Water | 180 |
| Emulsifying agent (e.g. dodecylbenzene sodium sulfonate) | 2 |
| Polymerization initiator (e.g. potassium persulfate) | 0.3 |
| Polymerization regulator [e.g., a mixture of dodecyl (60%), tetradecyl (20%) and hexadecyl (20%) tertiary mercaptans, hereinafter referred to as "mixed tertiary mercaptans"] | [1] 0.22 or 0.25 |

[1] See Table I, below.

The styrene, acrylonitrile, mixed tertiary mercaptans and bis(2,3-dibromopropyl) fumarate are mixed to give a liquid monomer feed. In general this mixture will not undergo mass polymerization at room temperature (25°–30° C.). The bis(2,3-dibromopropyl) fumarate has a negative heat of solution in styrene-acrylonitrile mixtures so that slight warming with agitation speeds up the act of solution. At higher temperatures, e.g. 40° C. mass polymerization may take place. The emulsion terpolymerization is conveniently carried out at 40–80° C. for a period of 3–7 hours. The terpolymerization proceeds at essentially the same rate as conventional styrene-acrylonitrile emulsion copolymerization. There is in general a close correspondence between feed ratio and the composition of the resulting terpolymers. Two such resin preparations are represented in Table I, below.

The resinous terpolymers of styrene/acrylonitrile/bis(2,3-dibromopropyl) fumarate are blended with a conventional rubbery copolymer of butadiene and acrylonitrile (containing about 35% acrylonitrile and about 1.5% of divinylbenzene as a cross-linking monomer; 40–65 Mooney viscosity [ML–4 at 212° F.]) in ratio of 75 parts resin to 25 parts rubber. Mixing of the rubber and resin is carried out by stirring together the resin and rubber latices (usually with sufficient of an antioxidant preparation, e.g., 2,6-ditertiarybutyl-4-methyl phenol, to give 1 part of antioxidant per 100 parts of the rubber). The mixed latices are added to a stirred 2% solution of calcium chloride in water initially at 95° C. The resulting slurry of coflocculated resin and rubber is cooled to 60–70° C. and filtered. After reslurrying in water, and filtration to remove non-polymeric contaminants derived from the emulsion polymerization, the mixed resin-rubber is dried at 60° C. until the moisture content is below 0.8%. This material is mixed with 1% zinc stearate (a lubricant) and 1% tribasic lead silicate (heat stabilizer). The mixture is banded on a rubber mill at a temperature between 280° and 350° F. (preferably 300°–320° F.) and mixed for 5 minutes. In one case, a conventional plasticizer, such as tricresyl phosphate, is mixed in, in amount of 12 parts per 100 parts of polymers. The material is removed from the mill and compression molded at 350° F. into slabs ¼″ thick. The Izod notched impact strength at room temperature is determined, as is the Rockwell R hardness, and the material is also subjected to a flame-resistance test (Underwriters' Laboratory provisional Method I). To perform this, three pieces ½″ x 5″ x ¼″ cut from a compression molding are tested. The test piece is ignited with a gas burner using a 5-inch flame with a 1½″ blue cone in a draft-free inclosure. The burner is positioned at an angle of 20° from the vertical It may be mentioned that bis(2,3-dibromopropyl) fumarate, for example, may be prepared by azeotropic esterification of fumaric acid with allyl alcohol to yield diallyl fumarate followed by the addition of bromine (selectively to the allylic double bonds in a polar solvent) to give bis(2,3-dibromopropyl) fumarate. In another method, bromine may be added to allyl alcohol at low temperature followed by addition of maleic anhydride and azeotropic esterification. One such preparation is as follows:

392 g. (4 moles) maleic anhydride
2180 g. (10 moles) dibromopropanol
560 ml. benzene
8 ml. concentrated sulfuric acid The dibromopropanol and one-half the benzene are placed in a three-liter three-necked flask equipped with a stirrer, dropping funnel, Dean and Stark trap and condenser. The mixture is refluxed until all traces of water have collected in the trap. The maleic anhydride is dissolved in the rest of the benzene at 60–70° C. and added to the flask with stirring at such a rate that reflux is maintained without external heating. After the initial exotherm is over, the sulfuric acid is added and refluxing continued until no more water is collected in the trap. Between 70 and 72 ml. will be collected (97–100% of theory). The stopcock of the trap is then opened and 350–400 ml. of benzene removed. The contents of the flask are then filtered by suction through a layer of filter medium to remove traces of fumaric acid and a black precipitate. The filtrate is added while still warm to three liters of methanol while stirring. The thick slurry of bis(2,3-dibromopropyl) fumarate crystals is cooled to 5° C. and filtered, the cake being pressed with a filter dam to remove the dark colored mother liquor. After air drying, the product, which melts at 65.0–68.0° C., weighs 1620 g. (78.5%). By dissolving in hot benzene (150 ml.) and precipitating in methanol as before, the melting point is raised to 67–8° C. and the last trace of color is removed. In a similar preparation, when 1500 ml. benzene is used and all of it removed in vacuo before methanol precipitation of the product, the yield is 84%.

Alternatively, esterification may be carried out in carbon tetrachloride. The dibromopropanol is added to the stirred and refluxing mixture of solvent, maleic anhydride and sulfuric acid. The water is collected as the upper layer in an appropriate trap after which the reaction mixture is filtered hot. The bis(2,3-dibromopropyl) fumarate crystallizes on cooling. The filter cake may be washed with methanol to remove color and the washings added to the carbon tetrachloride mother liquor causing separation of additional product. The overall yield is the same as in the previous preparation.

The foregoing preparations were carried out with a commercial crude dibromopropanol, made by addition of bromine to allyl alcohol and vacuum topping, which was 97–8% pure by distillation analysis.

Preparation of 2,3-dibromopropyl hydrogen fumarate for use in the invention may be effected by mixing equimolar quantities of dibromopropanol and maleic anhydride. An exotherm occurs at 70–80° C. after which the mixture is held at 100–120° C. for two hours. The crude product (M.P. 85–95° C.) can be recrystallized in a high state of purity (M.P. 101.5–102.5° C.) from immense quantities of boiling water, or more conveniently by recrystallization from butyl chloride (M.P. 100–102° C.) The infrared spectrum of this material conclusively demonstrates that it has the fumarate configuration.

A preparation of 2,3-dibromopropyl methacrylate may be made as follows:

86 g. (1 mole) methacrylic acid
240 g. (1.1 mole) dibromopropanol (B.P. 110° at 22 mm. pressure)
200 ml. benzene
2 ml. concentrated sulfuric acid
0.2 g. hydroquinone The mixture is refluxed under a Dean and Stark trap for 4.5 hours during which time 15.4 ml. of water is collected. To the reaction mixture is added one drop of cobalt naphthenate, 0.2 g. hydroquinone, and 3.86 g. sodium carbonate. Flash distillation at 50–110° C. (6 mm.) was followed by redistillation at the same pressure. A forerun, B.P. 70–102° C., was followed by 185 g. (65%) of product B.P. 106–6° C., a sample of which polymerized to a hard gloss at 60° C. in the presence of azobisisobutyronitrile.

Resins for use in the invention are most conveniently prepared by the usual conventional emulsion polymerization methods, although other methods such as mass polymerization, bead polymerization, or solution polymerization may also be used. Regulators, such as tertiary mercaptans, may be used to control the molecular weight. For example, the mixed tertiary mercaptan regulator shown in the working examples below may be varied to provide a resin having an intrinsic viscosity in the range of from 0.5 to 2.0, preferably 0.8 to 1.2, measured in dimethylformamide at 30° C.

The resin-rubber material of the invention may be characterized by its halogen content, which is derived and described from the polymerizablbe unsaturated halogen-containing ester included as a comonomer in the terpolymer resin and if desired in the rubber (and/or if desired in the graft copolymer when such is used). The higher the halogen content, the greater the degree of flame-resistance, other things being equal. Bromine is in general more effective than chlorine in conferring flame-resistance; as a rough "rule of thumb" about twice as much chlorine as bromine is required to give the same level of flame-resistance. The bromine content of the present rubber-resin compositions is at least 2%, say 2–15%, with 5–12% being preferred. Especially preferred are compositions containing at least 8% of bromine. The bromine content can, as indicated, be supplied not only by the resin, but also by the rubber (or the graft copolymer containing the rubber). In the case of resins containing insufficient halogen, or in the case of compositions containing amounts of resin near the lower end of the range previously specified, reliance is had on halogen content in the rubber or graft copolymer to bring the total halogen content up to the desired level. Certain tests for flame-resistance are more stringent than others. The Underwriters' Laboratory test is a very strict one, and in order to pass this test the composition of the invention must have a higher halogen content than is necessary to pass, for example, the American Society of Testing Materials test, which is a less strict one although adequate for most uses.

The compositions may be compounded with the usual pigments, fillers, antioxidants, stabilizers or other conventional secondary compounding ingredients. Plasticizers may be mixed with the compositions, in amount up to for example 15 parts, although 5–10 parts is preferred because large quantities of plasticizer tend to lower the heat distortion temperature and hardness of the composition. Phosphorous-containing plasticizers such as tricresyl phosphate are especially suitable because they tend to enhance the flame-resistance of the composition. If desired, other suitable polymeric materials may be added to the composition of the invention including styrene/acrylonitrile resin, butadiene/acrylonitrile rubber, styrene/acrylonitrile graft on polybutadiene, and analogous polymers made with alpha-methyl styrene, but it will be understood that if flame-resistance is to be retained the amount of such non-halogen containing polymers present must be limited. Polyvinyl chloride may be added to the composition of the invention.

The invention surprisingly makes it possible to provide compositions, similar to those of the Daly, Romeyen and Petras, and Childers and Fisk patents mentioned previously, but substituting the described halogen-containing ester for styrene, without any but minor changes in the excellent impact properties of the blends. Whatever small and the test piece with the 5″ axis horizontal. The flame is applied to the bottom (cut) edge of the specimen with the tip of the blue cone in contact for 10 seconds. After removal, if the piece extinguishes in 5 seconds or less, the flame is reapplied for a total of five 10-second ignitions. To pass, two of the three pieces tested shall comply with the following: Specimens shall not continue to burn longer than 10 seconds after each of five applications in the test flame. Particles shall not drip during any part of the test. The results are summarized in Table I.

parts of emulsifying agents (e.g., dodecylbenzene sodium sulfonate) in 51 parts of water. This mixture was heated to 60° C. and the apparatus purged with nitrogen. Potassium persulfate (0.3 part) was added. While stirring and maintaining a nitrogen atmosphere by passing in a slow stream of nitrogen, a solution of 21 parts of 2,3-bromopropyl hydrogen fumarate and 0.2 part of mixed-tertiary mercaptans in 20 parts of acrylonitrile and 55 parts of styrene was added over a period of three hours. After ½ hour the remainder of the emulsifying agent

*Table I*

STYRENE-ACRYLONITRILE-BIS(2,3-DIBROMOPROPYL) FUMARATE TERPOLYMERS

| Terpolymer Resin No. | Ratio of Styrene/Acrylonitrile/Bis (2,3-dibromopropyl) Fumarate In Charge | In Polymer | Amount of Mixed Tertiary Mercaptans (parts) | Intrinsic Viscosity in Dimethyl formamide | Percent Solids in Latex |
|---|---|---|---|---|---|
| 1 | 63/10.5/26.5 | 64/10/26 | 0.25 | 0.70 | 35.4 |
| 2 | 73/10.5/16.5 | 74/10/19 | 0.22 | 0.76 | 35.5 |

BLENDS OF ABOVE TERPOLYMER RESINS (75 PARTS) WITH BUTADIENE-ACRYLONITRILE RUBBER (25 PARTS)

| Resin No. | Plasticizer (tricresyl phosphite) | Room Temperature Izod Impact Strength (ft. lbs./in. notch) | Rockwell Hardness R Scale | Flame-Resistance Test |
|---|---|---|---|---|
| 1 | None | 1.5 | 89 | Passes. |
| 2 | 12 parts | 2.7 | 79 | Do. |

EXAMPLE II

Example I is repeated, using 75 parts of a resinous terpolymer of styrene/acrylonitrile/bis(2,3-dibromopropyl) fumarate (monomer ratio 55/20/25 in charge; 57/19/24 in polymer), prepared with 0.25 part of mixed tertiary mercaptans, having an intrinsic viscosity of 1.44, and 25 parts of various rubbery copolymers of butadiene/acrylonitrile/bis(2,3-dibromopropyl) fumarate, in the monomer ratios shown in Table II, below, with the results shown. No plasticizer was used in this example. The rubbery copolymers were emulsion polymerized for 17–21 hours at 95° F. according to the following recipe:

Ingredient: Amount
- Monomers _____ 100
- Water _____ 180
- Mixed tertiary mercaptans _____ 1.3
- Oleic acid _____ 1.16
- Sodium hydroxide _____ 0.1
- Emulsifying agent (e.g. dodecylbenzene sodium sulfonate) _____ 2.85
- Potassium persulfate _____ 0.26
- Divinylbenzene _____ 1.5

The properties of the flame-resistant resin-rubber blends are shown in Table II.

*Table II*

BLENDS OF 75 PARTS STYRENE ACRYLONITRILE/BIS (2,3-DIBROMOPROPYL) FUMARATE TERPOLYMER RESIN (55/20/25) WITH 25 PARTS BUTADIENE/ACRYLONITRILE/BIS(2,3-DIBROMOPROPYL) FUMARATE RUBBER

| Monomer Ratio of Rubber (Butadiene) Acrylonitrile/ Unsaturated Halogenated Ester in Polymer | Izod Impact Strength (ft. lbs. per in. notch) | Hardness Rockwell R Scale | Flame-Resistance |
|---|---|---|---|
| 70/24/5 | 5.8 | 88 | Passes. |
| 64/24/12 | 7.1 | 87 | Do. |
| 61/23/16 | 4.7 | 93 | Do. |

EXAMPLE III

To 300 parts of water was added 4 parts of 2,3-dibromopropyl hydrogen fumarate and 4 parts of a solution of 6 solution was added dropwise so that it had been all added after three hours. After a total reaction time of 5 hours, the resulting latex contained 20.4% solids. A sample of the terpolymer obtained by adding the latex to a 2% aqueous solution of calcium chloride at 95° C., filtering, and drying, was found to have an intrinsic viscosity of 0.94 in dimethylformamide. Analysis of the polymer for bromine and nitrogen showed that it contained 27% of combined 2,3-dibromopropyl hydrogen fumarate and 15.9% acrylonitrile.

To 1783 parts of this latex was added 420 parts of a latex of a rubbery copolymer of butadiene and acrylonitrile (monomer ratio 65/35), and an antioxidant preparation (e.g. 2 parts of 2,6-dietertiary-4-methyl phenol). Since the copolymer rubber latex contained 29.3% solids, resin and rubber were in the ratio 75/25. The mixed latices were flocculated by adding them to a 2% aqueous calcium chloride solution at 95° C. The resulting crumb was filtered, reslurried with water, filtered and dried 24 hours at 60° C. The dry crumb was blended with 1% zinc stearate and banded on a mill at 280° F. It was mixed for five minutes on the mill. The resulting slab was compression molded into plaques which were used in obtaining the following test results:

Notched Izod impact strength at room temperature,
   ft. lbs./inch of notch _____ 2.9
Rockwell R hardness _____ 98
Flame-resistance test _____ Passes

EXAMPLE IV

A terpolymer resin of styrene/acrylonitrile/and 2,4-dibromopropyl methacrylate is prepared using the polymerization recipe used for making the resinous terpolymer of Example I. The monomer feed ratio is 48/20/32 with 0.2 part of the mixed tertiary mercaptans. The latex has 34.5% solids after 6 hours at 60° C. The terpolymer contains 17.8% acrylonitrile and 29.7% 2,4-dibromopropyl methacrylate, and has an intrinsic viscosity in dimethylformamide of 0.67.

A blend of this terpolymer with the butadiene-acrylonitrile rubber shown in Example I, in a ratio of 75/25 has a notched Izod impact strength of 1.9 ft. lbs. and a Rockwell R hardness of 87. It passes the flame-resistance test.

EXAMPLE V

A graft copolymer of 34 parts of styrene and 16 parts of acrylonitrile on 50 parts of polybutadiene (in the form of a latex) is prepared (in accordance with, for example, Example I of U.S. Patent 2,820,773 referred to above). This graft copolymer is mixed with a terpolymer resin containing by analysis 24% 2,3-dibromopropyl fumarate and 19% acrylonitrile (57% styrene) in a ratio of 30/70 (i.e., 15% of polybutadiene); the resulting blend has an Izod impact strength of 1.5 and a Rockwell R hardness of 112. The graft copolymer is mixed with the same resin in ratio of 50/50 (i.e., 25% polybutadiene); Izod impact strength is 3.7, Rockwell R hardness is 98. The blends show noteworthy resistance to flame.

EXAMPLE VI

A graft copolymer was prepared by charging to a rubber latex a mixture of 50 parts of monomers as follows:

Styrene _____ 23
Acrylonitrile _____ 15
Bis(2,3-dibromopropyl) fumarate _____ 12

The rubber was a conventional polybutadiene rubber latex (52.3% solids) in amount sufficient to provide 50 parts of the rubber. The latex contained 0.3 part of potassium persulfate and was diluted to 180 parts of water. There was very little evidence of reaction during the first hour but thereafter polymerization proceeded at normal rates so that 33% solids was attained in 5 hours at 60° C. The graft copolymer contained 11% acrylonitrile and 6.9% bis(2,3-dibromopropyl) fumarate by analysis. This graft polymer was blended at two ratios with styrene-acrylonitrile/bis(2,3-dibromopropyl) fumarate terpolymer [19.9% acrylonitrile and 7.6% bis(2,3-dibromopropyl) fumarate, by analysis]. The blends had noteworthy flame-resistance, and displayed the following properties:

| | | |
|---|---|---|
| Ratio resin/graft | 50/50 | 74/26 |
| Ratio resin/rubber [1] | 75/25 | 87/13 |
| Notched Izod impact strength ft./lbs. | 7.0 | 3.0 |
| Rockwell R hardness | 94 | 106 |
| Percent Br | 7.6 | 9.2 |

[1] By rubber is meant the polybutadiene spine.

[1] By rubber is meant the polybutadiene spine.

The impact strengths shown are superior to what would be obtained in an analagous blend in which the bromine containing ester was replaced by styrene.

EXAMPLE VII

The foregoing examples are repeated, substituting methacrylonitrile for acrylonitrile, with generally similar results. The compositions have notably improved heat stability.

Having thus described my invention, what I claim and desire to protect by Letters Patent is:

1. A graft copolymer comprising, by weight, in 100 parts,
   (I) from 50 to 95 parts of a resin-forming monomer mixture comprising
      (a) a polymerizable monoethylenically unsaturated ester of a halogen-containing monoalcohol with an alpha monoethylenically unsaturated carboxylic acid
      (b) acrylonitrile, and
      (c) styrene,
   the said halogen-containing monoalcohol containing at least two holagen atoms selected from the group consisting of bromine and chlorine and containing from two to twelve carbon atoms, the said halogen atoms being spaced from the hydroxyl group of said alcohol by at least one carbon atom,
   and (II) from 50 to 5 parts of a butadiene rubber spine on which said resin-forming monomers are graft copolymerized.

2. A high impact strength flame-resistant thermoplastic blend of a resinous terpolymer comprising, by weight,
   (a) at least 5% of a polymerizable monoethylenically unsaturated ester of a halogen-containing monoalcohol with an alpha monoethylenically unsaturated carboxylic acid
   (b) at least 5% of acrylonitrile, and
   (c) at least 10% of styrene,
the said halogen-containing monoalcohol containing at least two halogen atoms selected from the group consisting of bromine and chlorine and containing from two to twelve carbon atoms, the said halogen atoms being spaced from the hydroxyl group of said alcohol by at least one carbon atom, and a graft copolymer comprising, in 100 parts, from 50 to 95 parts of the aforesaid monomers (a), (b), and (c) graft copolymerized in a latex containing correspondingly from 50 to 5 parts of a butadiene rubber spine.

3. A high impact strength flame-resistant thermoplastic blend of a resinous terpolymer comprising
   (a) a polymerizable monoethylenically unsaturated ester of a halogen-containing monoalcohol with an alpha monoethylenically unsaturated carboxylic acid
   (b) acrylonitrile, and
   (c) styrene,
the percentage by weight of (a), (b) and (c) in the terpolymer being such that they fall within the triangle *def* having the following triangular coordinates:

| Point | d | e | f |
|---|---|---|---|
| (a) Ester | 5 | 45 | 5 |
| (b) Acrylonitrile | 5 | 5 | 45 |
| (c) Styrene | 90 | 50 | 50 | the said halogen-containing monoalcohol containing at least two halogen atoms selected from the group consisting of bromine and chlorine and containing from two to twelve carbon atoms, the said halogen atoms being spaced from the hydroxyl group of said alcohol by at least one carbon atom, and a graft copolymer comprising, in 100 parts, from 40 to 60 parts of the aforesaid monomers (a), (b) and (c) graft copolymerized in a latex containing correspondingly from 60 to 40 parts of a butadiene rubber spine, the overall ratio of resin to rubber in said blend being from 70:30 to 95:5.

4. A composition as in claim 3 in which the said monoalcohol is 2,3-dibromopropanol.

5. A composition as in claim 3 in which the said halogen is bromine.

6. A composition as in claim 3 in which the said ester is bis(2-3-dibromopropyl) fumarate.

7. A composition as in claim 3 in which the said butadiene polymer is polybutadiene.

8. A composition as in claim 3 in which the said butadiene polymer is a copolymer of butadiene with up to 25% of monomeric material selected from the group consisting of styrene, acrylonitrile, bis(2,3-dibromopropyl) fumarate, and mixtures thereof.

9. A high impact strength flame-resistant thermoplastic composition comprising
   (a) a polymerizable monoethylenically unsaturated ester of a halogen-containing monoalcohol with an alpha monoethylenically unsaturated carboxylic acid
   (b) acrylonitrile, and
   (c) styrene,
the percentages by weight of (a), (b) and (c) in the terpolymer being such that they fall within the polygon *ghij* having the following triangular coordinates:

| Point | g | h | i | j |
|---|---|---|---|---|
| (a) Ester | 15 | 40 | 20 | 15 |
| (b) Acrylonitrile | 10 | 10 | 30 | 30 |
| (c) Styrene | 75 | 50 | 50 | 55 | the said halogen-containing monoalcohol containing at least two halogen atoms selected from the group consisting of bromine and chlorine and containing from two to twelve carbon atoms, the said halogen atoms being spaced from the hydroxyl group of said alcohol by at least one carbon atom, and a graft copolymer comprising, in 100 parts, from 40 to 60 parts of acrylonitrile and styrene graft copolymerized in a latex containing correspondingly from 60 to 40 parts of a butadiene rubber spine, the over-all ratio of resin to rubber in said blend being from 70:30 to 95:5.

10. A composition as in claim 9, in which the said ester is bis(2,3-dibromopropyl) fumarate and the said butadiene rubber is polybutadiene.

11. A high impact strength flame-resistant thermoplastic composition comprising, by weight,
(A) 70 to 95% of a resinous terpolymer, and correspondingly,
(B) 30 to 5% of a rubbery polymer,
the said resinous terpolymer (A) being a resinous terpolymer of (a) bis(2,3-dibromopropyl) fumarate
(b) acrylonitrile, and
(c) styrene, the percentages by weight of (a), (b) and (c) in the terpolymer being such that they fall within the triangle *def* having the following triangular coordinates:

| Point | d | e | f |
|---|---|---|---|
| (a) Bis(2,3-dibromopropyl) fumarate | 5 | 45 | 5 |
| (b) Acrylonitrile | 5 | 5 | 45 |
| (c) Styrene | 90 | 50 | 50 | the said rubbery polymer (B) being a terpolymer of butadiene, acrylonitrile, and bis(2,3-dibromopropyl) fumarate, containing at least 60% of butadiene, up to 15% of bis(2,3-dibromopropyl) fumarate, and at least 14% of acrylonitrile.

References Cited by the Examiner

UNITED STATES PATENTS 2,991,270   7/1961   Roper et al. _____ 260—890
3,151,183   9/1964   Bill et al. _____ 260—78.5

SAMUEL H. BLECH, *Primary Examiner.*

MURRAY TILLMAN, *Examiner.*

P. LIEBERMAN, *Assistant Examiner.*